United States Patent
Ward et al.

[15] 3,673,420
[45] June 27, 1972

[54] THICKNESS CONTROL SYSTEM FOR MULTI-LAYER OPTICAL THIN FILM WORK

[72] Inventors: John Ward, Elizabeth Park; Ross Paterson, Vale Park, both of Australia

[73] Assignee: The Commonwealth of Australia care of The Secretary of Supply, Parkes, Canberra, Australia

[22] Filed: May 8, 1969

[21] Appl. No.: 823,013

[30] Foreign Application Priority Data

May 10, 1968 Australia..................................37631

[52] U.S. Cl..........................250/219 TH, 250/226, 250/233, 250/237 R
[51] Int. Cl.................................................G01n 21/30
[58] Field of Search............356/161, 108; 250/207, 219 TH, 250/233, 232, 237, 226

[56] References Cited

UNITED STATES PATENTS

| | | | |
|---|---|---|---|
| 3,185,024 | 6/1965 | McCreanor | 250/219 TH X |
| 3,238,839 | 3/1966 | Day | 250/219 TH X |
| 3,439,175 | 4/1969 | Kammüller | 250/219 TH X |
| 3,497,704 | 2/1970 | Holmes | 250/233 |
| 2,978,590 | 4/1961 | Sheppard | 250/233 |
| 3,487,225 | 12/1969 | Button | 250/233 X |
| 3,139,537 | 6/1964 | Secretan | 328/27 X |
| 2,936,732 | 5/1960 | Ring | 356/108 |
| 2,750,834 | 6/1956 | Golay | 250/223 |

Primary Examiner—James W. Lawrence
Assistant Examiner—James W. Nelms
Attorney—Waters, Roditi, Schwartz & Nissen

[57] ABSTRACT

A method and apparatus for controlling the thickness of multi-layer optical thin film work by balancing light from each side of a particular wavelength through a chopper which alternately passes the light to filtering and detecting means so arranged that when a quarter wavelength or a multiple thereof has been deposited a balanced reading will be restored, a strobe pulse variable in time in relation to the processed waveform being used to select a reference point which will give enhanced accuracy of deposition control.

8 Claims, 4 Drawing Figures

THICKNESS CONTROL SYSTEM FOR MULTI-LAYER OPTICAL THIN FILM WORK

This invention relates to a method and apparatus for electronically controlling and monitoring the deposition of odd and even numbered quarter wavelength thick layers during the manufacture of multi-layer thin film filters.

One of the recognized concepts for measuring and controlling the deposition of thin films on substrates for the manufacture of filters and the like involves the use of a light source and a rotating scanning disc which has two diametrically opposed apertures at different radii subsequently referred to as light tracks. The light beam is chopped by the scanning disc before being projected to the glass substrate and then to a photomultiplier for the purpose of checking deposition thickness as it takes place in a vacuum chamber.

In the past this has been achieved by the successive deposition of layers under conditions where a light beam which is passed through the layer being deposited is periodically varied over a small range of wavelengths so that for all thicknesses of a layer other than the correct one the transmitted beams show variations in intensity at the fundamental frequency of the wavelength variation, such light being then passed on to a photocell or the like capable of measuring the variation, whereby the output of the detector is balanced or reaches zero or some other specifiable value when correct thickness of deposition has been achieved.

It should be remembered that during deposition under the test conditions outlined two slits which give the alternate light samples will cause variation to be recorded until such time as the peak of the particular wavelength intermediate between the wavelengths of the slits being observed is balanced in relation to the two slits, and in this way it is possible to select any particular wavelength and transmit it through the sampling mechanism, a variation in wavelength being effected by a change in position of a prism or a diffraction grating or similar device.

In the past it has also been found desirable to use a separate mechanical switch, on the rotating member carrying the two light tracks, to synchronously rectify the output of the cell by which means the phase and amplitude of the signal can be determined, but it has now been found necessary to further increase the precision and reliability of past control systems, using the above methods, by providing improved measuring techniques so that filters may be produced with greater efficiency and with greater precision of wavelength location.

In the present invention a strobe pulse is produced by a photoelectric switch, or a magnetic or similar switch, operated by a separate light source or other means seen through a separate slit (or slits) also carried on the member carrying the two light tracks, which photocell (or similar) and light system are capable of rotary adjustment together about the center of rotation of the rotating member so that the position and hence the time of generation of the strobe pulse may be changed in relation to the waveform obtained from the two sampling slits.

Increased stability of control and resulting improvements in the accuracy of measurement are obtained in the present invention by converting the approximately square-wave output obtained from the two sampling slits into a sine wave of the same frequency, by a filtering circuit which removes unwanted low and high frequency variations including those produced by the possible rotation of the substrate and also the 50 Hz and multiple frequency variations arising from the A.C. mains. Further filtering after rectification additionally increases stability and measurement accuracy.

In the present invention the strobe pulse is used to synchronously rectify the sine wave signal and by adjustment of the time of actuation of the strobe pulse, as previously mentioned, it may be made to coincide with any part of the waveform, ideally with a positive or negative peak. The action of the strobe pulse is to clamp that part of the sine wave, say the positive peak, to a fixed reference level so that when the signals arising from the two sampling slits are different in amplitude then not only the extent of the difference will be determined by the amplitude of the sine wave but the direction of the difference will also be obtainable from the positive or negative indication of this on measuring meters. In this way odd or even numbers of quarter wavelength layers of material may be identified by the polarity of the indicated signal and if a continuous recording is made the total number of quarter wavelength layers may be easily identified.

In addition the present invention uses a different optical arrangement from the past systems referred to so as to give greater stability to the signals produced by the sampling system.

In use the control waveform produced is first adjusted with a clear substrate which is to receive the coating by varying the area, preferably width, of one or both of the slits so that the same photometric output is given through each slit resulting in a balanced condition which causes a zero signal to be indicated by the measuring meters. Thereafter as a result of the effects of deposition of material on the substrate the spectral distribution of the light falling on the two slits is changed so that the balanced condition is disturbed and the meters show a deflection away from zero. Restoration of the balanced condition will take place again when the optical thickness of the deposited material becomes a quarter of a wavelength of the light for which the wavelength selection device is adjusted and successively when the thickness reaches two, three or more quarter wavelengths.

The actual apparatus for carrying the invention into effect can be considerably varied in its constructional details but so that the nature of the invention and its operation may be more fully appreciated an embodiment will now be described with reference to the accompanying drawings which are given by way of illustration only and are not to be taken as necessarily limiting the invention to the details referred to.

Figure 3:
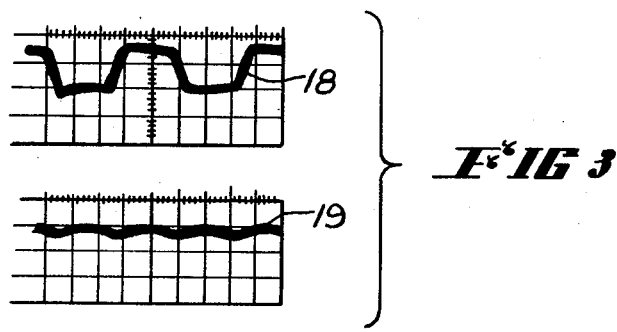
Figure 4:
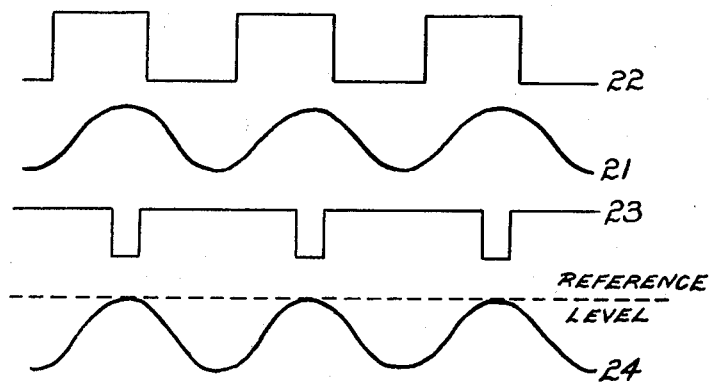

FIG. 3 are oscillograph traces indicating the nature of the photomultiplier output which is generated from the light after passing through the scanning disc. The upper part of the figure shows the unbalanced signal condition and the lower part shows the balanced condition, and FIG. 4 shows schematically progressively downwards first the photomultiplier signal after amplification, then the filtered amplified signal, then the strobe pulse signal and lastly the D.C. restored signal before final filtering.

Figure 1:
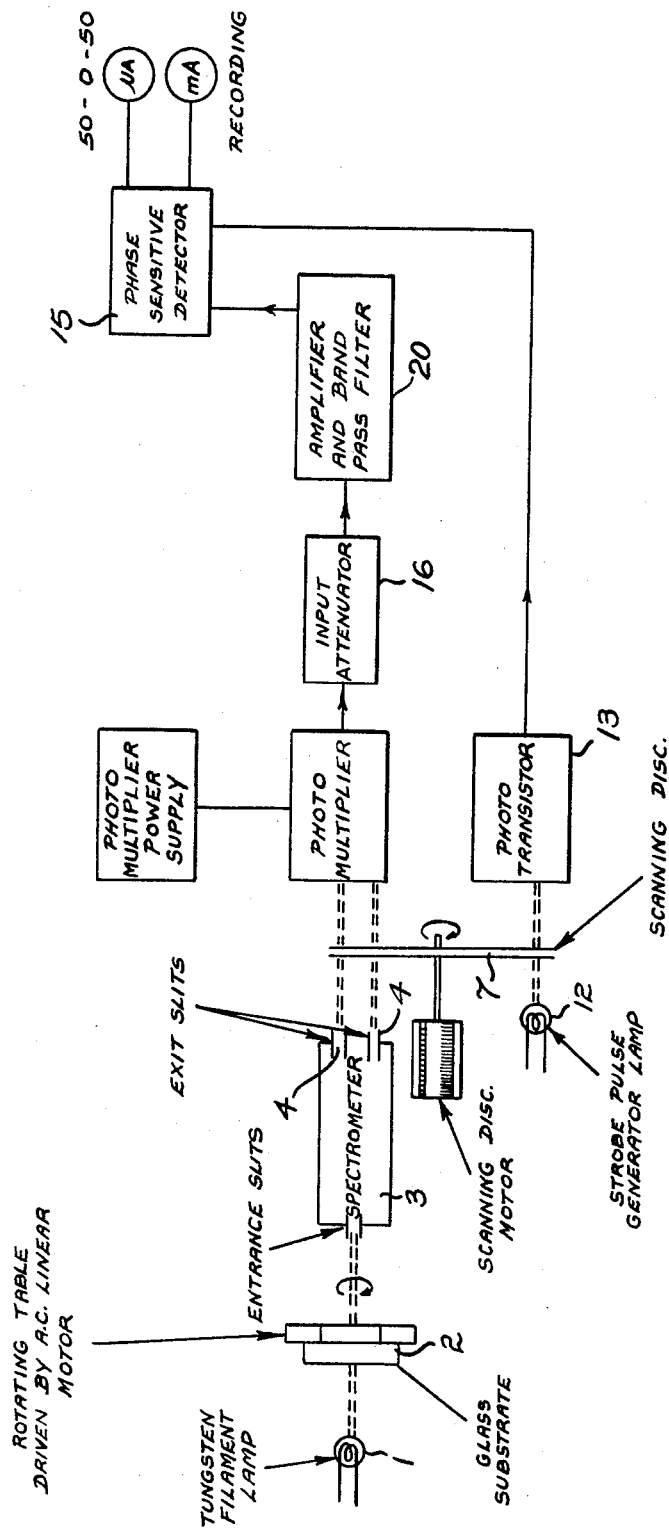
FIG. 1 shows a block diagram of the essential components of the invention.
Figure 2:
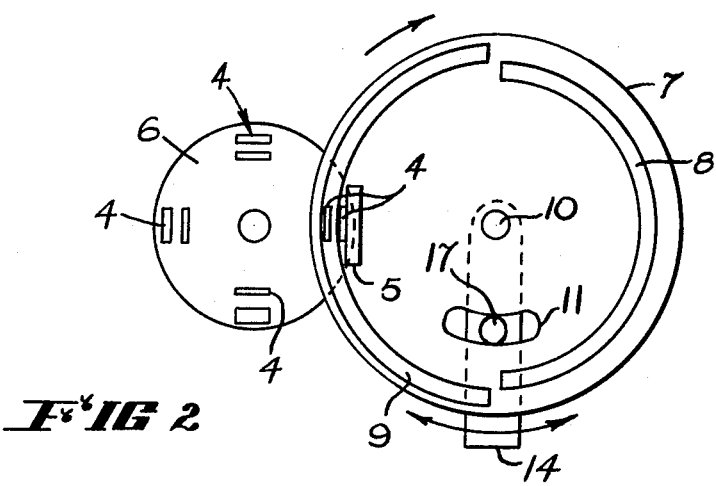
FIG. 2 is a front elevation of the scanning disc and the associated mechanism.

Referring first to FIG. 1, light from the tungsten filament lamp 1 or similar source, which is maintained at a constant temperature to produce a stable distribution of energy, is transmitted through the substrate 2, usually rotating, and focussed on the entrance slit of a spectrometer 3, monochromator or similar wavelength selection device. The spectrometer 3 (or a similar device) is equipped with two exit slits 4 one of which is adjustable in width, e.g. by a blade 5 and the other fixed, as shown in FIG. 2. The two slits allow light of two slightly different wavelengths to pass through them, the difference in wavelength being dependent upon the inherent dispersion of the spectrometer and upon the physical separation of the slits. To vary the physical separation the slits 4—4 can be formed in a disc 6 having a plurality of such slits which may be brought into register as required. The spectrometer 3 is adjustable so that any part of the spectrum may be formed in the region of the slits. The rotating scanning disc 7 shown more particularly in FIG. 2 contains two half annular slots or tracks 8 and 9 which are concentric with the axis 10 of rotation of the disc and diametrically opposite each other and of different radii. This scanning disc is positioned between the slits 4 and a photomultiplier in such a way that when the disc rotates, the photomultiplier has light from one slit falling on it for one half cycle and from the other for the other half cycle. The speed of rotation of the disc in operation is nominally 1,500 r.p.m., so that an electrical square wave signal of 25 Hz is generated by the photomultiplier, the amplitude of the A.C. signal being dependent on the difference in level of the light from the two slits falling on the photomultiplier. These speeds can of course be varied and the figure referred to is exemplary only.

In addition the scanning disc 7 has another smaller slot 11 at a different radius from the other two tracks 8 and 9 through which in one position of the disc light from another lamp 12 is able to pass onto a light sensitive phototransistor 13 for a short duration in each revolution of the scanning disc. The position of this light and phototransistor together can be varied around the axis of rotation of the disc, by for instance being mounted on an arm 14 movable about the axis 10, so that the time at which the phototransistor 13 is energized by the light 12 can be made to alter in relation to the signals generated through the slits 4—4 and tracks 8 and 9. The rectangular pulse produced by the phototransistor is connected to the phase sensitive detector 15.

The square-wave (similar to 18 in FIG. 3) produced by the photomultiplier is A.C. coupled through an input attenuator 16 to an amplifier and 25 Hz electrical narrow band pass filter 20 which eliminates unwanted frequencies and produces a 25 Hz sine wave 21 (FIG. 4) which varies linearly in amplitude with the applied square wave input 22.

Adjustment of the position of the arm 14 carrying the phototransistor 13 and its lamp 12 can then be made so that the produced strobe pulse 23 is made to coincide with the peak of the 25 Hz filtered sine wave, as shown at 24 in FIG. 4, so that the strobe pulse clamps this part of the sine wave signal to a fixed reference level in a D.C. restorer circuit as a result of which noise confusion of the D.C. restoration point is minimized, enhancing the accuracy of the output signal which may be either negative or positive with respect to the reference level.

In the upper graph of FIG. 3 the output waveform is in an unbalanced state but in the lower portion it will be noted that the trace 19, corresponding to the trace 18 in the upper figure, has been balanced by balancing the light coming through the slits 4—4 by varying the area of one of the slits, this being the type of unfiltered signal which results when the apparatus is adjusted with the light coming through a clear substrate and being passed through a spectrometer to the slits, with adjustment made firstly to select the required part of the spectrum and secondly to the area of the two slits to achieve as near a balance as is possible.

After balancing in this way, the waveform will gradually change from the form 19 to the waveform designated 18 as an unbalance occurs due to deposition of a layer material on the glass, but when the required thickness has been reached, namely a quarter wavelength for normal purposes, the condition of waveform 19 is again restored. This then allows the build up to continue until such time as the trace 19 is again achieved whereupon the exact thickness of the layer has been reached and evaporation of the coating substance is stopped or continued with the same or other materials by repetition of this process.

The thickness control system as described in the present invention is capable of producing interference filters and the like with an accuracy of wavelength location of better than ± 0.025 percent of the wavelength (i.e. filters for the region 4,000A can be produced to an accuracy of ± 1A).

What we claim is:

1. A thickness control method for multi-layer optical thin film work comprising projecting a light beam through a transparent substrate used to measure the thickness of deposition of thin films on articles being coated and on the substrate, passing the beam through a spectrometer to transmit bands on each side of a selected wavelength through a pair of exit slits each directing its beam through a rotating, scanning disc which passes each beam alternately to recording means in a particular waveform, adjusting at least the width of one of the slits in relation to the width of the other to give the same photometric output from each slit whereby to give a zero difference signal with a clear substrate, generating a strobe synchronous with the scanning disc to reference a particular part of the waveform of the combined processed photometric output, whereby the final reading can be referenced to such selected part of the combined waveform to enhance the accuracy of deposition, and varying the strobe pulse position in relation to the start of the two chopped beams to effect selected reference of the desired part of the processed waveform.

2. A thickness control method for multi-layer optical thin film work according to claim 1 comprising the further step of filtering the combined outputs from the chopped beams and then varying the strobe pulse position in relation to the start of the two chopped beams to effect selected reference of the desired part of the processed waveform.

3. A thickness control method for multi-layer film work according to claim 1 comprising adjusting the distance between the slits for wavelength separation adjustment.

4. A thickness control method for multi-layer film work according to claim 1 wherein the strobe pulse is used to synchronously rectify a sine wave signal which is produced from the chopped signal by amplification and filtering, and wherein adjustment of the time of actuation of the strobe pulse is made to coincide with a peak of the sine wave and clamp that part of the sine wave to a fixed reference level whereby when the signals arising from the two said slits are different in amplitude then the direction of the difference is determined in addition to the extent of the difference.

5. Thickness control apparatus for multi-layer film work comprising a light source, a spectrometer, a substrate between said light source and said spectrometer onto which a film the thickness of which is to be determined may be evaporated, means provided with a pair of slits at least one of which is adjustable for passing light beams from each side of a selected wavelength from the said spectrometer, a slotted scanning member positioned to alternately chop the said light beams, a photomultiplier positioned to receive chopped signals passing the scanning member and to produce an output signal whose amplitude is a function of the difference of level of the chopped signals passing through the respective slits, means coupled to the photomultiplier to shape the said output signal, a strobe pulse generator means associated with the said scanning member and cooperating therewith for producing stable pulses, and means to cause the strobe pulses to control the reference of a specific part of the shaped signal to provide indication of the achievement of the desired thickness of the film depending on balancing of the amplitudes of the chopped signals passing through the slits.

6. Thickness control apparatus according to claim 5, wherein the strobe pulses are produced by an aperture provided in the said scanning member, said strobe pulse generator means comprising a strobe pulse generator lamp on one side of said scanning member, photosensitive means on the other side of said member, and means to change the phasing of the strobe pulse generator means in relation to the aperture in the said member.

7. Thickness control apparatus according to claim 5 wherein said strobe pulse generator means comprises a light actuated strobe pulse generator associated with and having phase adjustment in relation to the scanning member, a phase sensitive detector for, a phototransistor to receive said strobe pulses and pass same to said phase sensitive detector, and an amplifier and band pass filter between the photomultiplier and the phase sensitive detector, whereby the chopped signal from the spectrometer is amplified and filtered to give a sine wave signal and the strobe pulses are adjustable to coincide with a selected peak of the sine wave so produced.

8. Thickness control apparatus according to claim 5 wherein the scanning member is a slotted and apertured disc.

* * * * *